US010555652B2

(12) United States Patent
Han et al.

(10) Patent No.: US 10,555,652 B2
(45) Date of Patent: Feb. 11, 2020

(54) CYCLONE DUST COLLECTOR AND VACUUM CLEANER HAVING THE SAME

(71) Applicant: SAMSUNG ELECTRONICS CO., LTD., Suwon-si, Gyeonggi-do (KR)

(72) Inventors: Jung Gyun Han, Suwon-si (KR); Won Min Lee, Suwon-si (KR); Shin Kim, Hwaseong-si (KR)

(73) Assignee: SAMSUNG ELECTRONICS CO., LTD, Suwon-si (KR)

( * ) Notice: Subject to any disclaimer, the term of this patent is extended or adjusted under 35 U.S.C. 154(b) by 497 days.

(21) Appl. No.: 15/296,669

(22) Filed: Oct. 18, 2016

(65) Prior Publication Data
US 2017/0112341 A1 Apr. 27, 2017

(30) Foreign Application Priority Data

Oct. 21, 2015 (KR) .................. 10-2015-0146551

(51) Int. Cl.
B01D 50/00 (2006.01)
A47L 9/16 (2006.01)
(Continued)

(52) U.S. Cl.
CPC ............. *A47L 9/1608* (2013.01); *A47L 7/02* (2013.01); *A47L 9/1683* (2013.01); *B01D 45/16* (2013.01);
(Continued)

(58) Field of Classification Search
CPC .......... A47L 9/1608; A47L 9/32; A47L 9/106; A47L 5/28; A47L 9/1666; A47L 7/02;
(Continued)

(56) References Cited

U.S. PATENT DOCUMENTS 7,704,290 B2 * 4/2010 Oh ........................ A47L 9/1666
15/352
9,980,619 B2 * 5/2018 Cho ........................ A47L 5/362
(Continued)

FOREIGN PATENT DOCUMENTS

EP 1136028 9/2001
EP 2769658 8/2014
(Continued)

OTHER PUBLICATIONS

Form PCT/ISA/210; International Search Report dated Jan. 24, 2017 in related International Patent application No. PCT/KR2016/011730 (4 pages).
(Continued)

Primary Examiner — Dung H Bui
(74) Attorney, Agent, or Firm — Staas & Halsey LLP

(57) ABSTRACT

According to one aspect of the present disclosure, because there is no need for a user to pick dust or the like adhered to an outer circumferential surface of the grill off by hand, the vacuum cleaner is easy to use. In addition, when removing dust or the like adhered to an outer circumferential surface of the grill, generation of secondary contamination around the case can be prevented.

A cyclone dust collector, the cyclone dust collector comprises a case configured to accommodate dust separated from suctioned air, a first cover configured to open, and close a bottom of the case and a grill assembly provided to be detachable from the case.

13 Claims, 17 Drawing Sheets

(51) Int. Cl.

| | |
|---|---|
| *A47L 7/02* | (2006.01) |
| *B01D 45/16* | (2006.01) |
| *B04C 5/187* | (2006.01) |
| *B04C 5/22* | (2006.01) |
| *B04C 9/00* | (2006.01) |
| *B01D 46/10* | (2006.01) |
| *A47L 9/32* | (2006.01) |
| *A47L 5/28* | (2006.01) |

(52) U.S. Cl.
CPC ............ *B01D 50/002* (2013.01); *B04C 5/187* (2013.01); *B04C 5/22* (2013.01); *B04C 9/00* (2013.01); *A47L 5/28* (2013.01); *A47L 9/32* (2013.01); *B01D 46/106* (2013.01); *B01D 2279/55* (2013.01); *B04C 2009/004* (2013.01)

(58) Field of Classification Search
CPC ..... A47L 9/1683; B01D 45/16; B01D 50/002; B01D 46/106; B01D 2279/55; B04C 9/00; B04C 5/22; B04C 5/187; B04C 2009/004

See application file for complete search history.

(56) References Cited

U.S. PATENT DOCUMENTS

| | | | |
|---|---|---|---|
| 2001/0052166 A1* | 12/2001 | Park | A47L 5/28 15/353 |
| 2004/0111824 A1 | 6/2004 | Vuijk | |
| 2004/0163206 A1* | 8/2004 | Oh | A47L 9/1675 15/353 |
| 2004/0177471 A1* | 9/2004 | Jung | A47L 9/1675 15/352 |
| 2004/0187253 A1 | 9/2004 | Jin et al. | |
| 2005/0198765 A1 | 9/2005 | Jung et al. | |
| 2005/0223518 A1 | 10/2005 | Nakai et al. | |
| 2006/0042202 A1* | 3/2006 | Lee | A47L 9/0081 55/289 |
| 2006/0286499 A1* | 12/2006 | Kim | A47L 9/1625 432/106 |
| 2010/0083833 A1* | 4/2010 | Morphey | A47L 9/1608 95/268 |
| 2010/0132319 A1 | 6/2010 | Ashbee et al. | |
| 2014/0082883 A1* | 3/2014 | Tran | A47L 9/1633 15/353 |
| 2014/0359966 A1* | 12/2014 | Han | A47L 9/1683 15/327.1 |
| 2014/0366311 A1 | 12/2014 | Han et al. | |
| 2016/0287042 A1* | 10/2016 | Han | A47L 9/1683 |

FOREIGN PATENT DOCUMENTS

| | | |
|---|---|---|
| WO | 02/067753 A1 | 9/2002 |
| WO | WO 2012/031077 A1 | 3/2012 |

OTHER PUBLICATIONS

Extended European Search Report dated Sep. 21, 2018 in European Patent Application No. 16857762.5.

\* cited by examiner

CYCLONE DUST COLLECTOR AND VACUUM CLEANER HAVING THE SAME

CROSS-REFERENCE TO RELATED APPLICATION

This application claims the benefit of priority of Korean Patent Application No. 10-2015-0146551, filed on Oct. 21, 2015 in the Korean Patent Office, the disclosure of which is incorporated by reference.

BACKGROUND

1. Field

Embodiments of the present disclosure relates to a cyclone dust collector with improved usability and a vacuum cleaner having the same.

2. Description of the Related Art

A vacuum cleaner is an apparatus which performs cleaning by suctioning air using a suction force generated from a fan and a motor and filtering foreign substances included in the suctioned air.

For filtering foreign substances included in suctioned air, a vacuum cleaner includes a dust collector therein so that the foreign substances are filtered by a predetermined filter. Such a filter that filters foreign substances in the dust collector includes a porous filter by which foreign substances are forcibly filtered while air passes through the porous filter and a cyclone type dust collector by which foreign substances are filtered out during cyclonic air flow.

A cyclone dust collector may be widely used for a canister type vacuum cleaner, an upright type vacuum cleaner, a hand type vacuum cleaner, etc.

The cyclone dust collector may include an inlet into which air is introduced and an outlet through which air is discharged to the outside. Air introduced into the inlet may be discharged to the outside after dust is filtered.

The outlet of the cyclone dust collector may be provided with a grill. An air passing hole may be formed in the grill to prevent dust of a certain size or more from escaping through the outlet. Due to directed air of the cyclone dust collector, large dust, hair, and the like may be wound around an outer circumferential surface of the grill. In a conventional cyclone dust collector, there is an inconvenience in that a user has to remove dust, hair, and the like wound around an outer circumferential surface of the grill by hand.

SUMMARY

Additional aspects and/or advantages will be set forth in part in the description which follows and, in part, will be apparent from the description, or may be learned by practice of the invention.

Therefore, it is an aspect of the present disclosure to provide a cyclone dust collector which can facilitate removing dust, hair, and the like wound around an outer circumferential surface of a grill when the grill is separated, and a vacuum cleaner including the same.

In according with one aspect of the present disclosure, a cyclone dust collector, the cyclone dust collector comprises a case configured to accommodate dust separated from suctioned air, a first cover configured to open, and close a bottom of the case and a grill assembly provided to be detachable from the case.

The grill assembly is pulled out of an upper part of the case.

The vacuum cleaner further comprises a second cover configured to cover an upper part of the case.

The second cover includes a cleaning part configured to remove dust adhered to a surface of the grill assembly.

The cleaning part is provided to protrude from a bottom surface of the second cover.

An opening through which the grill assembly passes is formed at the second cover.

The grill assembly includes a locking part configured to lock the second cover, and the second cover includes a locking hole into which the locking part is inserted and fixed.

The second cover includes a microfilter configured to filter dust from air.

The first cover includes a locking part locked to the grill assembly, and the grill assembly includes a locking hole into which the locking part is inserted.

The first cover includes a sliding hole through which the locking part passes.

The locking part moves in a radial direction in the sliding hole when the locking part is pressed by the grill assembly.

The first cover includes an elastic member configured to provide the locking part with an elastic force.

The locking part is moved in one direction when the locking part is pressed by the grill assembly, and the locking part is moved in the other direction by the elastic force of the elastic member to return to an original position thereof when a force applied to the locking part is removed.

The first cover is opened when the grill assembly is rotated in one direction.

The first cover is coupled by a hinge to the case.

In according with one aspect of the present disclosure, a cyclone dust collector comprises a case in which an inlet through which air is introduced is formed, a first cover configured to be positioned at one side of the case, a second cover configured to open and close the other side of the case, and a grill configured to be accommodated in the case and installed through the first cover and the second cover, wherein coupling between the grill and the second cover also is released when coupling between the grill and the first cover is released.

The second cover opens the other side of the case when the coupling between the grill and the second cover is released.

The second cover includes a locking part configured to be elastically supported, and the grill includes a locking hole into which the locking part is inserted and fixed.

The first cover includes a cleaning part configured to remove dust adhered to a surface of the grill when the grill is pulled out of the case.

The grill is provided to be detachable from the case, the first cover, and the second cover.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Hereinafter, a cyclone dust collector and a vacuum cleaner including the same according to one embodiment will be described in detail with reference to the accompanying drawings.

Figure 1:
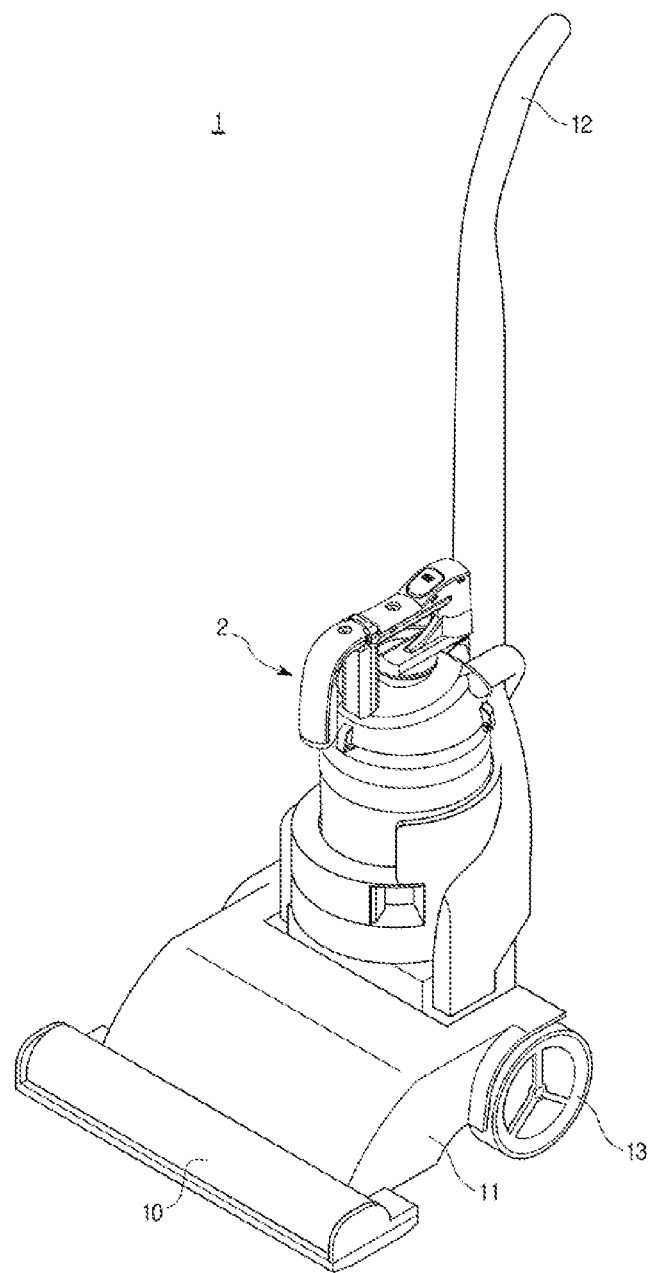
FIG. 1 is a perspective view illustrating a vacuum cleaner according to one embodiment.

FIG. 1 is a perspective view illustrating a vacuum cleaner according to one embodiment.

Referring to FIG. 1, a vacuum cleaner 1 according to one embodiment may be an upright type vacuum cleaner. The vacuum cleaner 1 may include a suctioning part 10 in contact with a surface to be cleaned to suction air, a main body 11 provided with a fan motor which generates a suction force, and a cyclone dust collector 2 installed at the main body 11.

The suctioning part 10 may be directly connected to the main body 11 without using a separate hose or the like. A handle 12 may be provided on an upper side of the main body 11 for a user to operate. Wheels 13 may be provided at a lower end of the main body 11 to move the main body 11. The suctioning part 10 may be provided with a suction brush (not shown) to easily perform cleaning of a carpet or the like.

The cyclone dust collector 2 may be detachably installed at the main body 11. Air suctioned via the suctioning part 10 is introduced into the cyclone dust collector 2 to form a directed air to form the cyclone current and may leave the cyclone dust collector 2 after dust is filtered.

Figure 2:
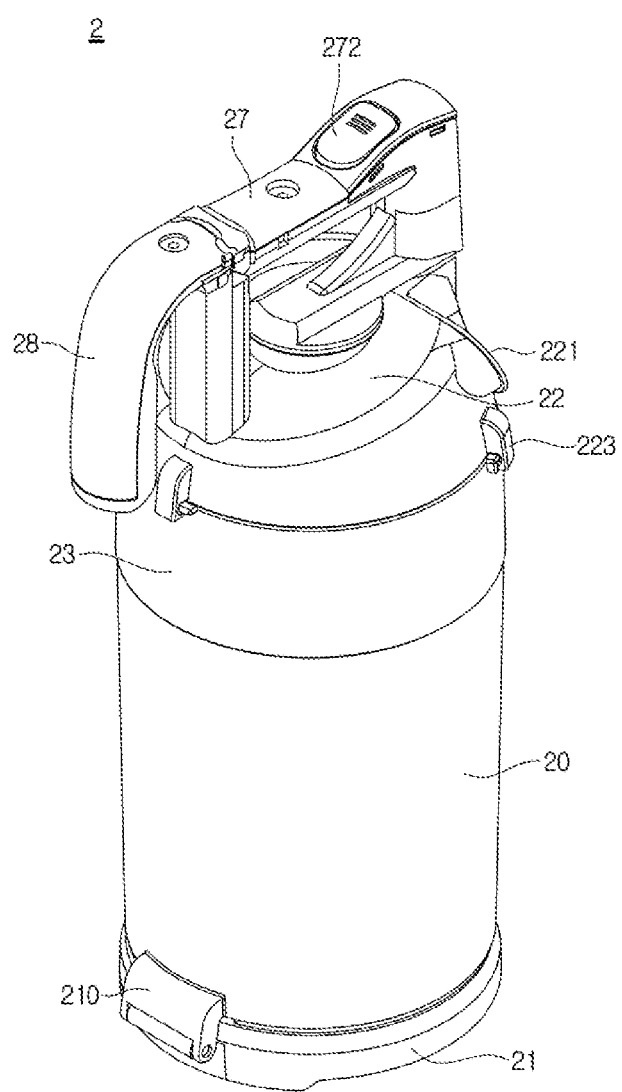
FIG. 2 is a perspective view illustrating a cyclone dust collector according to one embodiment.
Figure 3:
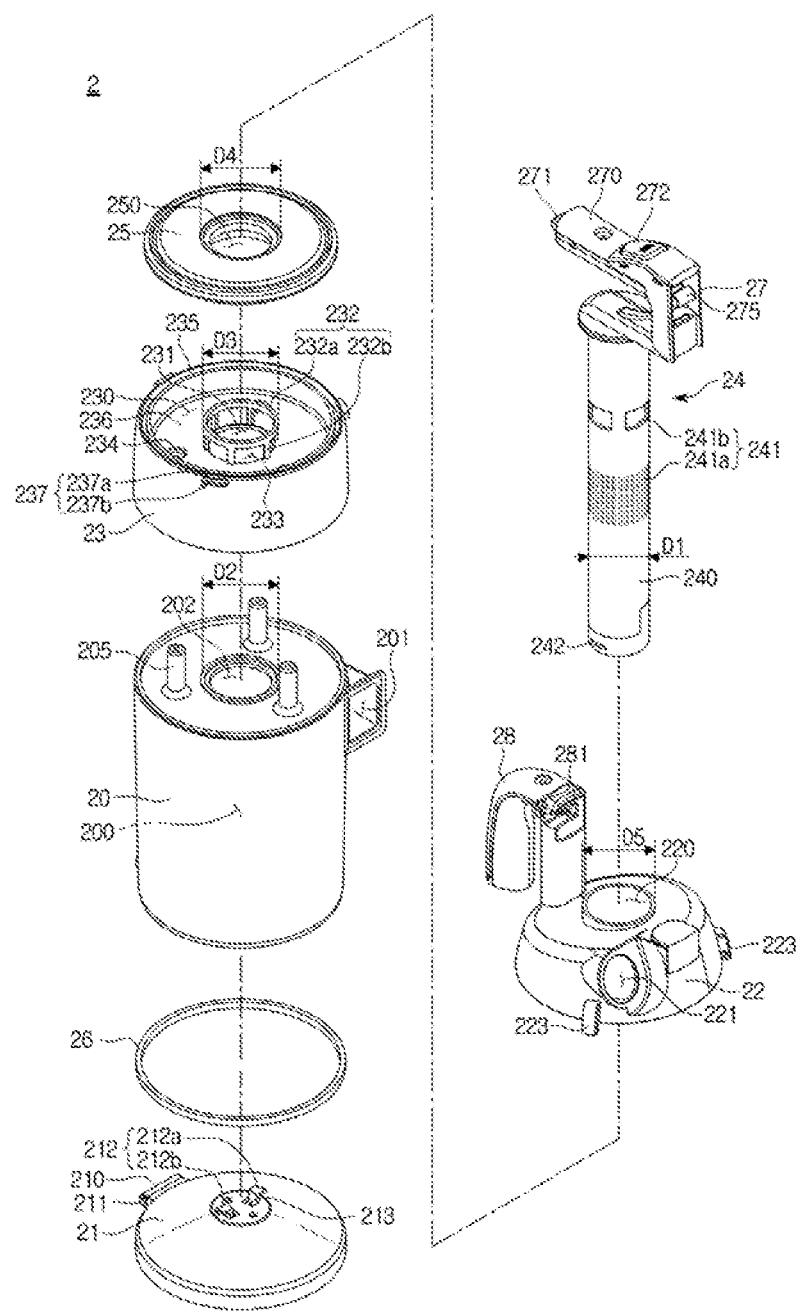
FIG. 3 is an exploded perspective view illustrating a cyclone dust collector according to one embodiment.
Figure 4:
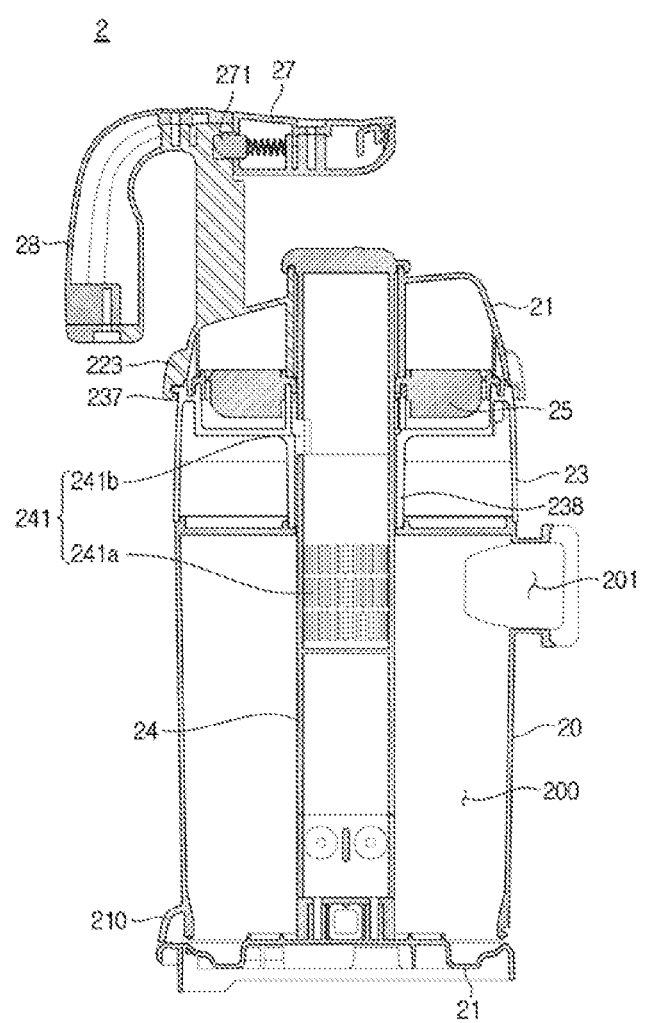
FIG. 4 is a cross-sectional view illustrating a cyclone dust collector according to one embodiment.

FIG. 2 is a perspective view illustrating a cyclone dust collector according to one embodiment, FIG. 3 is an exploded perspective view illustrating a cyclone dust collector according to one embodiment, and FIG. 4 is a cross-sectional view illustrating a cyclone dust collector according to one embodiment.

Referring to FIGS. 2 to 4, the cyclone dust collector 2 may include a case 20 into which suctioned air is introduced via the suctioning part 10, a lower cover 21 which covers a bottom of the case 20, and an upper cover 22 which covers a top of the case 20.

An intermediate cover 23 in which a microfilter 25 is installed may be further provided between the case 20 and the upper cover 22. A grill assembly 24 in which air passing holes 241 are formed may be accommodated in the case 20. The grill assembly 24 may be detachably installed at the case 20.

The case 20 may be provided in a cylindrical shape. An inlet 201 into which air suctioned via the suctioning part 10 is introduced may be provided at one side of the case 20. In the air introduced into the case 20 via the inlet 201, dust may be separated and collected in an internal space 200 of the case 20, and the air from which dust is removed may be discharged through an outlet 202 provided at the other side of the case 20.

The inlet 201 may be provided at a side surface of the case 20 and the outlet 202 may be provided at an upper surface of the case 20. The outlet 202 may be provided at the center of the upper surface of the case 20. A diameter D2 of the outlet 202 may be the same as a diameter D1 of a grill 240 of the grill assembly 24.

At least a portion of the bottom of the case 20 may be formed to be opened. For example, the entire bottom of the case 20 may be formed to be opened and covered by the lower cover 21. The outlet 202 opened to discharge the air from which dust is removed in the case 20 may be formed at the top of the case 20. The top of the case 20 may be opened and closed by the upper cover 22, and the bottom of the case 20 may be opened and closed by the lower cover 21.

The lower cover 21 may be installed to be openable and closable at the bottom of the case 20. For example, the lower cover 21 may be connected to the case 20 by a hinge. A first hinge part in which a hinge hole is formed may be provided at the case 20. A second hinge part 210 in which a rotating protrusion 211 to be inserted into the hinge hole is formed may be provided at the lower cover 21. The lower cover 21 may open and close the bottom of the case 20 by the rotating protrusion 211 being inserted into the hinge hole and rotated A locking part 212 coupled to the grill 240 may be provided at the lower cover 21. Due to the locking part 212 being coupled to the grill 240, the lower cover 21 may be locked not to be arbitrarily opened. Detailed configuration of the locking part 212 will be described below.

A sealing member 26 may be interposed for sealing between the lower cover 21 and the case 20. The sealing member 26 may be formed of rubber, a silicon material, etc.

The upper cover 22 may be installed to be openable and closable at the top of the case 20. The intermediate cover 23 may be interposed between the case 20 and the upper cover 22. The upper cover 22 may be detachably coupled to the intermediate cover 23.

A coupling protrusion 205 may be provided at the upper surface of the case 20. A plurality of coupling protrusions 205 may be provided. Coupling holes 234 into which the coupling protrusions 205 are inserted may be formed at the intermediate cover 23. The coupling holes 234 are provided to correspond to the coupling protrusions 205. By inserting the coupling protrusions 205 into the coupling holes 234 provided at the intermediate cover 23, the intermediate cover 23 may be installed at the upper surface of the case 20.

A chamber 230 into which air discharged from the case 20 via the outlet 202 is introduced may be provided in the intermediate cover 23. An opening 231 into which the grill 240 of the grill assembly 24 is inserted may be formed in the intermediate cover 23. A diameter D3 of the opening 231 may be the same as the diameter D1 of the grill 240 of the grill assembly 24.

The microfilter 25 may be installed in the intermediate cover 23. Dust may be filtered again while the air discharged via the outlet 202 passes through the microfilter 25. An opening 250 through which the grill 240 of the grill assembly 24 passes may be formed at the microfilter 25. A diameter D4 of the opening 250 may be the same as the diameter D1 of the grill 240.

The intermediate cover 23 may be provided with a mounting part 235 on which the microfilter 25 may be mounted. The mounting part 235 may be positioned at an upper side of the intermediate cover 23. When the microfilter 25 is mounted on the mounting part 235, an upper surface 236 of the intermediate cover 23 and the microfilter 25 may be positioned to be spaced apart from each other.

The intermediate cover 23 may be provided with supporters 232 which support the microfilter 25. The supporters 232 may be positioned on a periphery of the opening 231. The supporters 232 may include a plurality of first supporters 232b which protrude from the upper surface 236 of the intermediate cover 23, and a second supporter 232a which connects the plurality of first supporters 232b and on which the microfilter 25 is mounted. The plurality of the first supporters 232b may be arranged along a perimeter of the opening 231. The second supporter 232a may be provided to have the same shape as the opening 231. A diameter of the second supporter 232a may be the same as or greater than the diameter of the opening 231.

The air discharged via the outlet 202 is introduced into the side of the intermediate cover 23 via the opening 231, and may be introduced into the chamber 230 formed in the intermediate cover 23 via a space formed between adjoining first supporters 232b. The air introduced into the chamber 230 may pass through the microfilter 25 positioned at an upper part of the intermediate cover 23 to flow to the side of the upper cover 22.

The upper cover 22 may be provided with an exit 221 from which air may be discharged. The air from which dust is filtered may escape to the outside via the exit 221.

An opening 220 through which the grill 240 of the grill assembly 24 passes may be formed in the upper cover 22. A diameter D5 of the opening 220 may be the same as the diameter D1 of the grill 240.

A cleaning part 238 which may eliminate dust or the like adhered to a surface of the grill 240 may be provided at an inner side of the upper cover 22 adjacent to the opening 220 or at a bottom surface of the intermediate cover 23 adjacent to the opening 231. The cleaning part 238 may be provided to protrude downward from the bottom surface of the intermediate cover 23. The cleaning part 238 may be provided to be in contact with the surface of the grill 240. Dust or the like adhered to the grill 240 may be removed by an inside surface of the intermediate cover 23 which forms the opening 231. A position of the cleaning part 238 is not limited to the above descriptions.

The upper cover 22 may be detachably installed at the intermediate cover 23. The upper cover 22 and the intermediate cover 23 may be installed by a hook method. The upper cover 22 may be provided with a hook part 223, and the intermediate cover 23 may be provided with an engaging part 237 which may be engaged with the hook part 223. A plurality of hook parts 223 may be provided and be disposed to be spaced apart along an outer side surface of the upper cover 22. A plurality of engaging parts 237 may be disposed to be spaced apart along an outer side surface of the intermediate cover 23 to correspond to the hook parts 223.

Each of the engaging parts 237 may include a first engaging part 237a and a second engaging part 237b bent from the first engaging part 237a. When the upper cover 22 is positioned on an upper part of the intermediate cover 23 so that the hook part 223 and the engaging part 237 do not interfere with each other and the upper cover 22 rotates in one direction, the hook part 223 formed at the upper cover 22 may be engaged by the first engaging part 237a formed at the intermediate cover 23.

Here, the second engaging part 237b may serve the role of a stopper which prevents the upper cover 22 from rotating in the one direction. Specifically, the second engaging part 237b may prevent the hook part 223 from continuing to rotate in the one direction and leaving the first engaging part 237a. A user may release a state in which the hook part 223 is engaged by the first engaging part 237a by rotating the upper cover 22 in the other direction, and may detach the upper cover 22 from the intermediate cover 23.

The upper cover 22 may be provided with a handle 28. The handle 28 may be integrally injection-molded with the upper cover 22. The handle 28 may be provided with a locking groove 281 into which a locking part 271 provided at an operation part 27, which will be described below, is inserted.

The operation part 27 may be provided at one side of the grill assembly 24. The grill assembly 24 and the operation part 27 may be integrally formed. The grill assembly 24 may include the grill 240 in which the air passing holes 241 are formed. The grill 240 may be inserted into the case 20. When the grill 240 is inserted into the case 20, the operation part 27 may be provided to be positioned outside the upper cover 22.

The grill 240 may be provided in a hollow cylindrical shape. The air passing holes 241 formed in the grill 240 may include first air passing holes 241a through which the air from which dust is filtered in the case 20 is introduced into the inside of the grill 240 and second air passing holes 241b from which the air introduced into the grill 240 escapes.

Dust may be filtered again while the air from which dust is filtered by the directed air current passes through the first air passing holes 241a. The air discharged via the second air passing holes 241b may move toward the side of the intermediate cover 23 via the outlet 202.

The grill 240 may be provided with a locking hole 242 into which the locking part 212 provided at the lower cover 21 is inserted. When the locking part 212 is inserted into the locking hole 242, the lower cover 21 may maintain a closed state in which a lower surface of the case 20 is not opened. When the locking part 212 leaves the locking hole 242, the lower cover 21 may rotate about the rotating protrusion 211 to open the lower surface of the case 20. A state in which the locking part 212 is inserted into the locking hole 242 may be referred to as a locked state, and a state in which the locking part 212 leaves the locking hole 242 may be referred to as a locking released state.

The operation part 27 may be provided with a grip 270 held by a hand to be directly operated by a user, the locking part 271 inserted into the locking groove 281 provided at the upper cover 22, and an operation button 272 which may be operated to fix or detach the operation part 27 from the main body 11.

Figure 5:
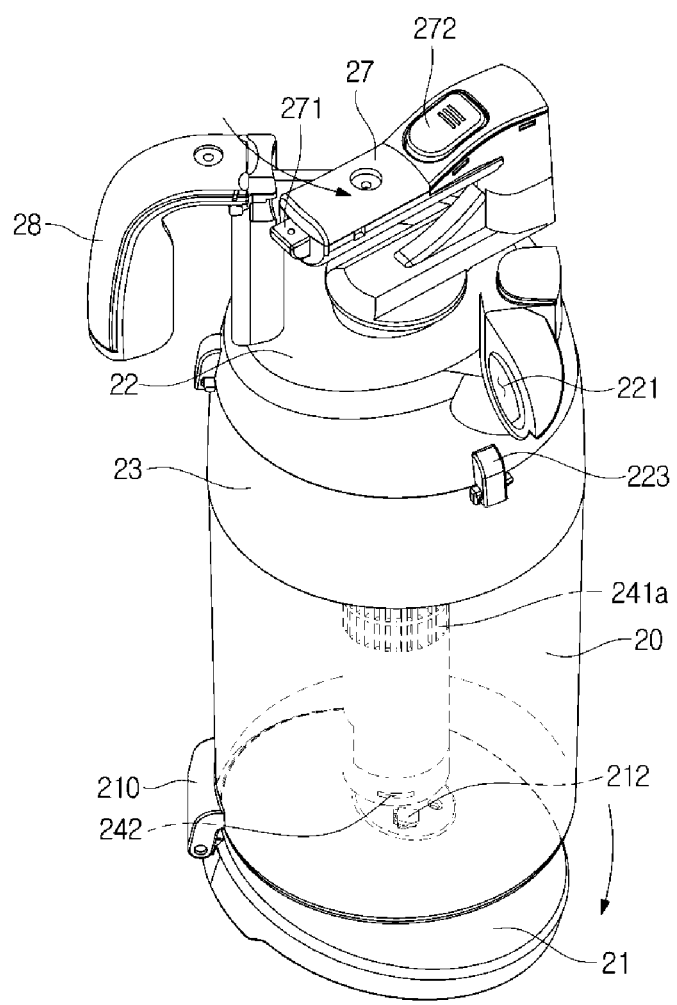
FIGS. 5 and 6 are views illustrating operations when a cyclone dust collector is opened according to one embodiment.
Figure 6:
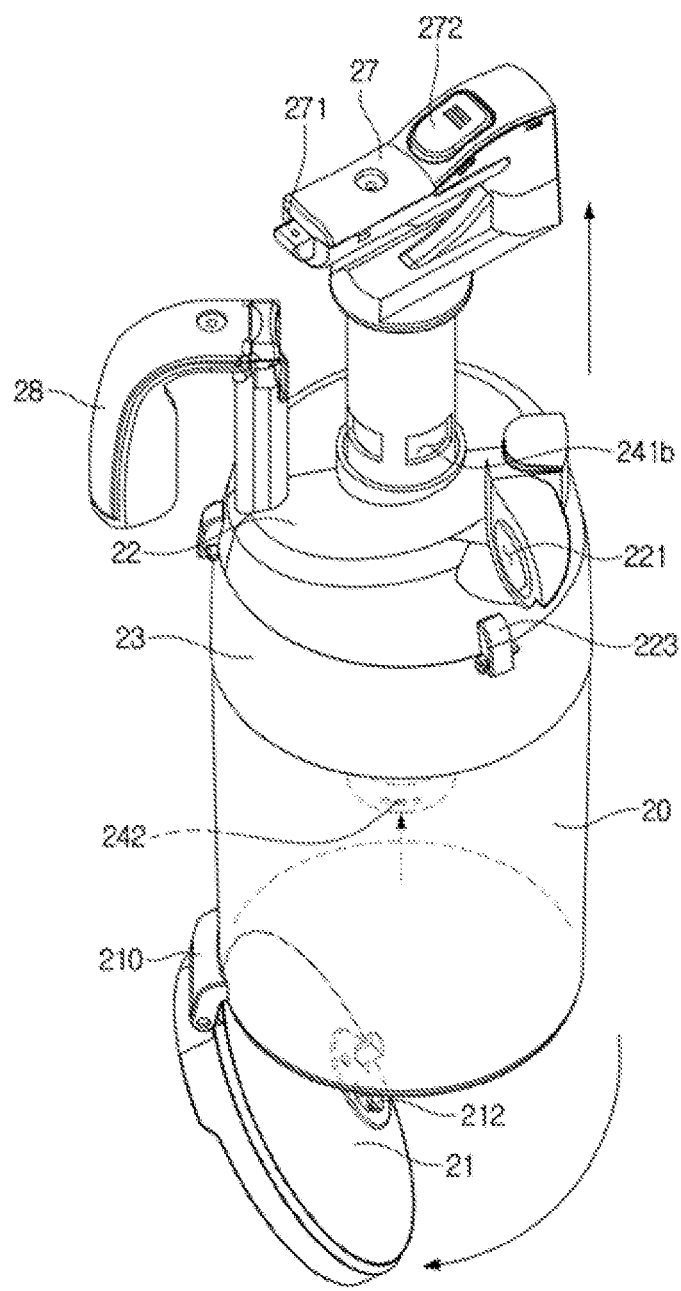

FIGS. 5 and 6 are views illustrating operations when a cyclone dust collector is opened according to one embodiment.

Referring to FIGS. 5 and 6, the grill assembly 24 provided at the cyclone dust collector 2 according to one embodiment may be provided to be relatively movable with respect to the upper cover 22 and the case 20. The grill assembly 24 may be installed to be detachable from the cyclone dust collector 2. The grill assembly 24 may also be provided to only be relatively movable with respect to the cyclone dust collector 2, but not to be completely detached.

With the grill assembly 24 installed in the cyclone dust collector 2, the lower cover 21 may maintain the closed state when the locking part 212 provided at the lower cover 21 is inserted into the locking hole 242 formed at the grill 240. The locking part 271 provided at the operation part 27 may be locked by being inserted into the locking groove 281 provided at the handle 28. Due to the locking part 271 of the operation part 27 connected to the grill assembly 24, the grill assembly 24 may be fixed to the cyclone dust collector 2 so as not to be detached therefrom unless due to an external force.

The grill assembly 24 may be rotated in one direction due to an external force. A user may grasp the grip 270 of the operation part 27 to rotate the grill assembly 24 in one direction. When the grill assembly 24 is rotated in the one direction, the locking part 212 of the lower cover 21 may leave the locking hole 242 formed at the grill 240. When the locked state is released due to the locking part 212 leaving the locking hole 242, the lower cover 21 may be opened.

When the grill assembly 24 rotates in the one direction, the locking part 271 provided at the operation part 27 may leave the locking groove 281 provided at the handle 28 to be released from the locked state. The grill assembly 24 may be detached from the cyclone dust collector 2 by an external force. A user may hold and pull the grip 270 provided at the operation part 27 to have the grill assembly 24 leave via the opening 220 formed at the upper cover 22.

As described above, the lower cover 21 may be provided to be released from the locked state only with an operation of rotating the grill assembly 24 in the one direction by a user. When the grill assembly 24 is pulled out of the top of the upper cover 22, dust or the like adhered to the grill 240 may be removed by the cleaning part 238. Therefore, a user may easily remove dust or the like adhered to the surface of the grill 240 only with an operation of pulling out the grill assembly 24.

When a user installs the grill assembly 24 at the cyclone dust collector 2, the user may insert the grill 240 through the opening 220 formed at the upper cover 22 and rotate the operation part 27 and the grill assembly 24 in the other direction. The locking part 271 provided at the operation part 27 may be inserted into the locking groove 281 provided at the handle 28. Thereby, the grill assembly 24 may be installed at the side of the upper cover 22.

After the grill assembly 24 is installed, the user may close the lower cover 21 to cover the bottom of the case 20. When the lower cover 21 is closed, the locking part 212 provided at the lower cover 21 may be inserted into the locking hole 242 formed at the grill 240. Thereby, the lower cover 21 is locked to maintain the closed state.

Figure 7:
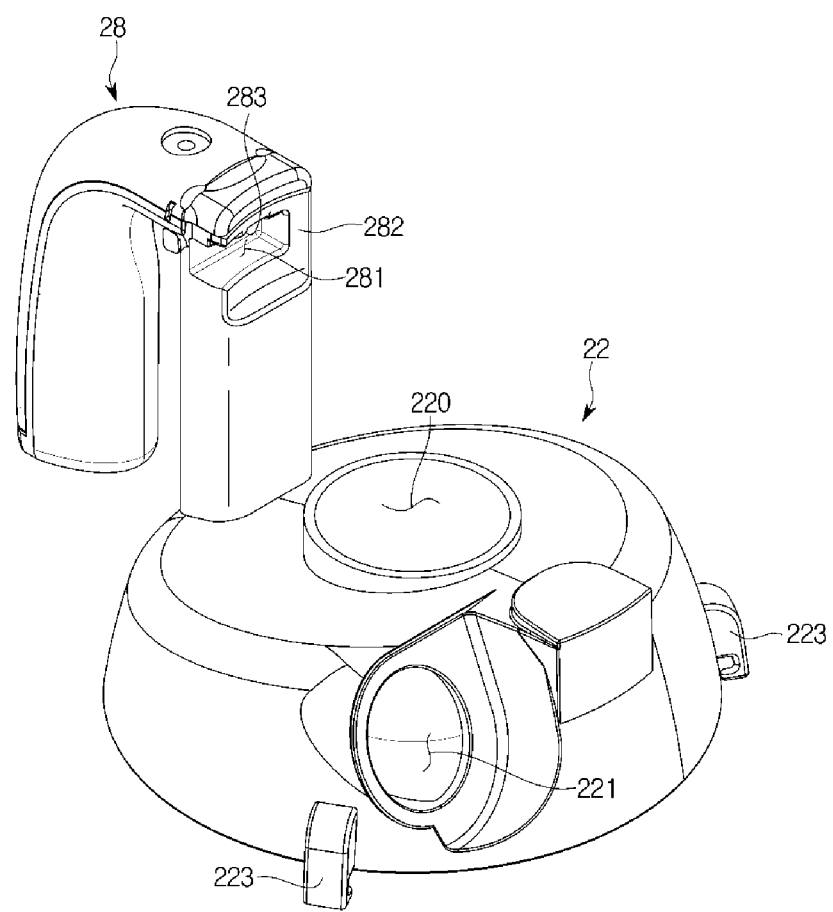
FIG. 7 is a view illustrating a handle of a cyclone dust collector according to one embodiment.
Figure 8:
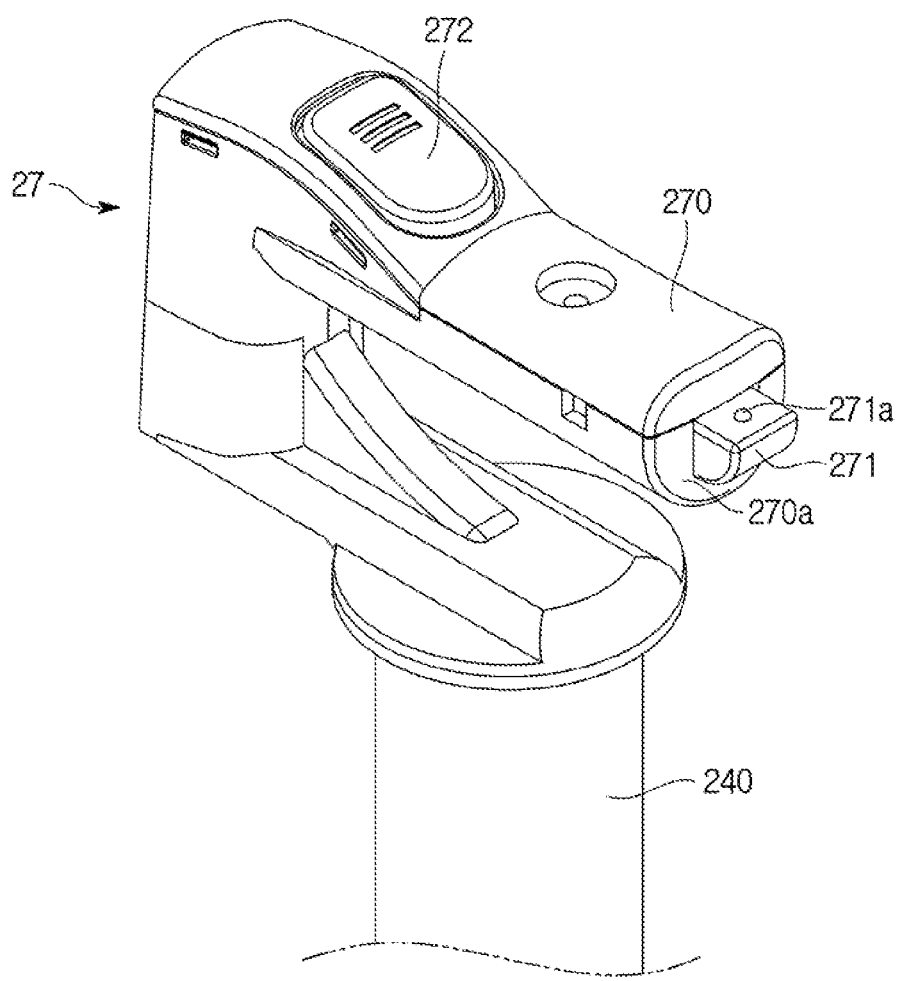
FIG. 8 is a view illustrating an upper cover of a cyclone dust collector according to one embodiment.
Figure 9:
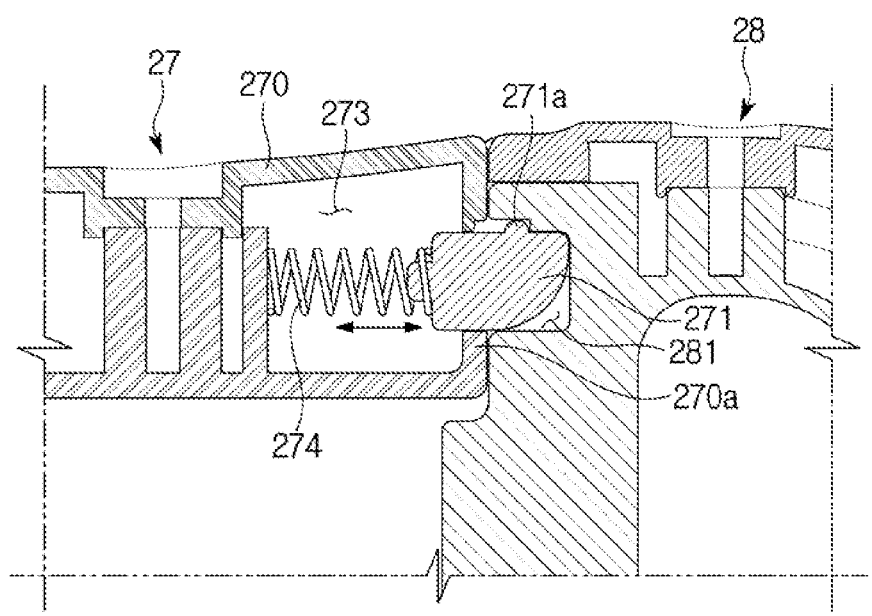
FIG. 9 is a view illustrating a handle and a locking part of an upper cover according to one embodiment.
Figure 10:
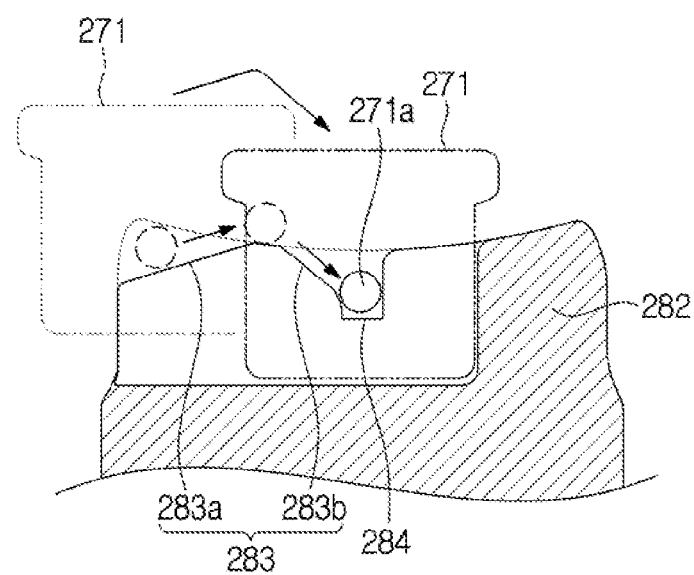
FIG. 10 is a view illustrating a state in which a locking part according to one embodiment is operated.

FIG. 7 is a view illustrating a handle of a cyclone dust collector according to one embodiment, FIG. 8 is a view illustrating an upper cover of a cyclone dust collector according to one embodiment, FIG. 9 is a view illustrating a handle and a locking part of an upper cover according to one embodiment, and FIG. 10 is a view illustrating a state in which a locking part according to one embodiment is operated.

Referring to FIGS. 7 to 10, the locking groove 281 is formed at the handle 28 connected to the upper cover 22 according to one embodiment, and the locking part 271 which may be inserted into the locking groove 281 may be provided at the operation part 27 connected to the grill assembly 24.

The locking groove 281 may be provided to extend to be long in a lateral direction. A user may rotate the operation part 27 in the lateral direction to have the locking part 271 enter into the locking groove 281 or the locking part 271 leaves the locking groove 281. For example, the locking part 271 may enter into the locking groove 281 when the operation part 27 is rotated in one direction, and the locking part 271 may leave the locking groove 281 when the operation part 27 is rotated in the other direction.

The locking part 271 may be provided so that at least a portion thereof is inserted into the grip 270 by an external force. One side of the locking part 271 may be elastically supported by an elastic member 274. The grip 270 may be provided with an elastic member accommodating part 273 in which the elastic member 274 may be accommodated. The elastic member 274 supports the rear of the locking part 271. When the locking part 271 is pressed in a direction opposite an elastic force direction of the elastic member 274 by an external force, at least a portion of the locking part 271 may be inserted into the elastic member accommodating part 273. When the elastic force is removed, the locking part 271 may be moved forward by the elastic force of the elastic member 274.

An engaging protrusion 271a may be provided at one side of the locking part 271. A guide part 283 which guides a movement of the engaging protrusion 271a may be provided at the locking groove 281 provided at the handle 28. When the operation part 27 rotates in one direction to insert the locking part 271 into the locking groove 281, the engaging protrusion 271a may move along the guide part 283. The engaging protrusion 271a and the guide part 283 may be positioned to correspond to each other so that the engaging protrusion 271a may move along the guide part 283 when the locking part 271 is inserted into the locking groove 281.

The guide part 283 may be provided in a groove form by which the inserted engaging protrusion 271a is guided or may be provided to protrude from an inside wall of the locking groove 281. The embodiment in which the engaging protrusion 271a is provided at the locking part 271 and the guide part 283 is provided at the side of the locking groove 281 is described as above, however it is also possible that a protrusion is provided at the side of the locking groove 281 and a guide part along which the protrusion moves is provided at the side of the locking part 271.

After the locking part 271 is inserted into the locking groove 281, the locking part 271 needs to be fixed in the locking groove 281 so that the locking part 271 does not arbitrarily leave the locking groove 281 to release the locked state. The locking part 271 moves along the guide part 283 to be positioned at a fixing part 284 and then fixed.

The guide part 283 may be provided to protrude from an inside surface of the handle 28 which forms the locking groove 281. For example, the guide part 283 may be provided to protrude from an upper inside surface of the handle 28 which forms the locking groove 281. Here, the engaging protrusion 271a may be formed to protrude from an upper surface of the locking part 271.

The guide part 283 may include a first guide part 283a provided at an entrance side of the locking groove 281 into which the locking part 271 enters, and a second guide part 283b bent from the first guide part 283a. The first guide part 283a may be formed to be inclined from the front to the rear. The first guide part 283a may guide the engaging protrusion 271a to move rearward. When the locking part 271 moves along the first guide part 283a, the locking part 271 may move toward a side of the elastic member accommodating part 273 at which the elastic member 274 is positioned.

The second guide part 283b may be formed to be inclined from the rear to the front. The second guide part 283b may guide the engaging protrusion 271a to return to the front.

When the locking part 271 moves along the second guide part 283b, the locking part 271 may return to the front due to the elastic force of the elastic member 274. The engaging protrusion 271a may be guided by the second guide part 283b to be positioned at the fixing part 284. The engaging protrusion 271a is engaged by the second guide part 283b formed to be inclined and may be fixed in a state of being positioned at the fixing part 284 unless due to an external force.

To release the locked state, a user may exert an external force to rotate the operation part 27 in the other direction. The engaging protrusion 271a may leave the locking groove 281 by sequentially passing through the second guide part 283b and the first guide part 283a. Thereby, the engaging protrusion 271a may leave the locking groove 281 to be released from the locked state.

An inside wall 282 which connects an upper surface and a lower surface may be positioned at one side of the locking groove 281. Specifically, the one side of the locking groove 281 is opened to allow the locking part 271 to enter, and the other side is blocked by the inside wall 282 to hinder the locking part 271 from moving further. The inside wall 282 may serve the role of a stopper which may restrict a movement of the locking part 271.

As described above, with configurations of the engaging protrusion 271a and the guide part 283, the locking part 271 may be inserted into the locking groove 281 and locked without any other locking mechanism. Without an operation of releasing the locked state by any other locking mechanism, a user may exert an external force to rotate the operation part 27 so that the locking part 271 leaves the locking groove 281 to release the locked state.

Figure 11:
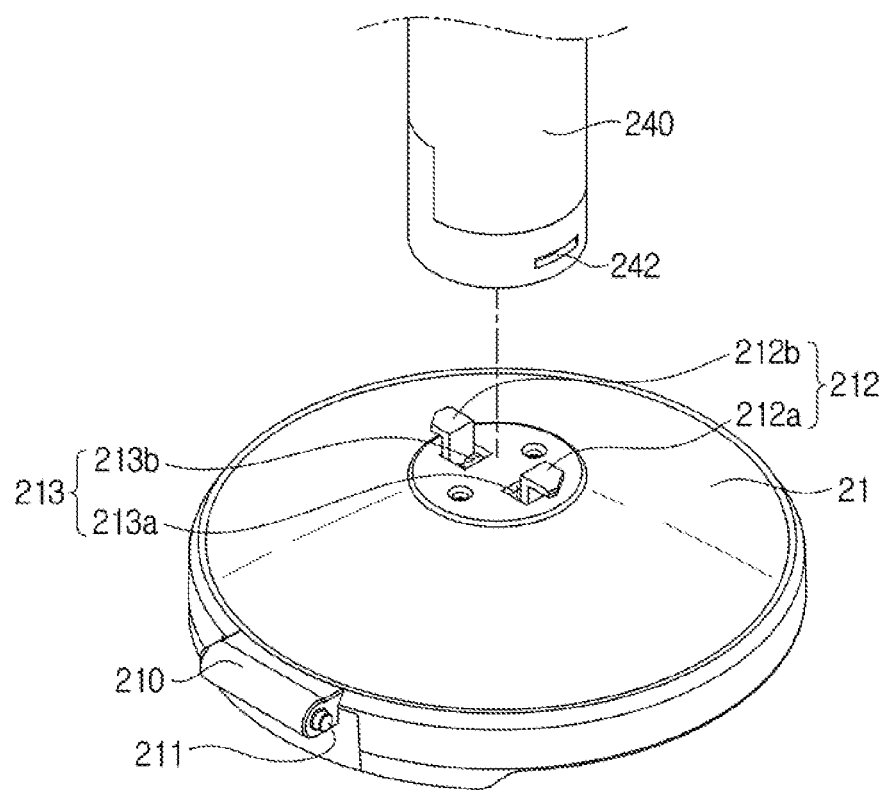
FIG. 11 is a view illustrating a lower cover and a portion of a grill of a cyclone dust collector according to one embodiment.
Figure 12:
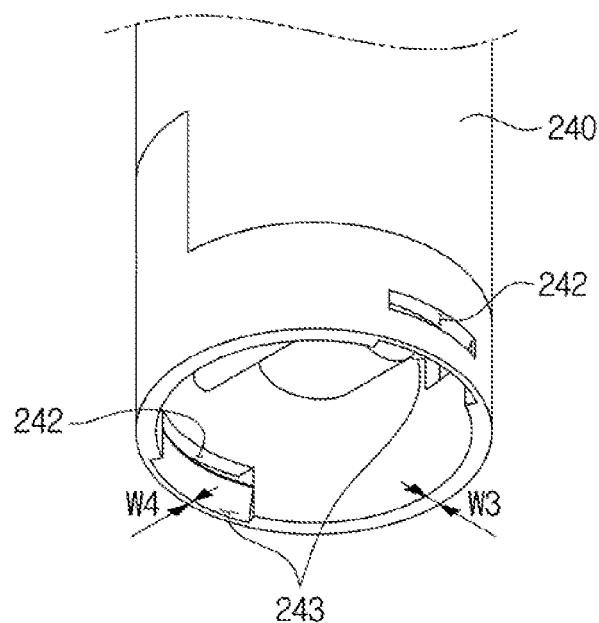
FIG. 12 is a view illustrating a portion of a grill of a cyclone dust collector according to one embodiment.
Figure 13:
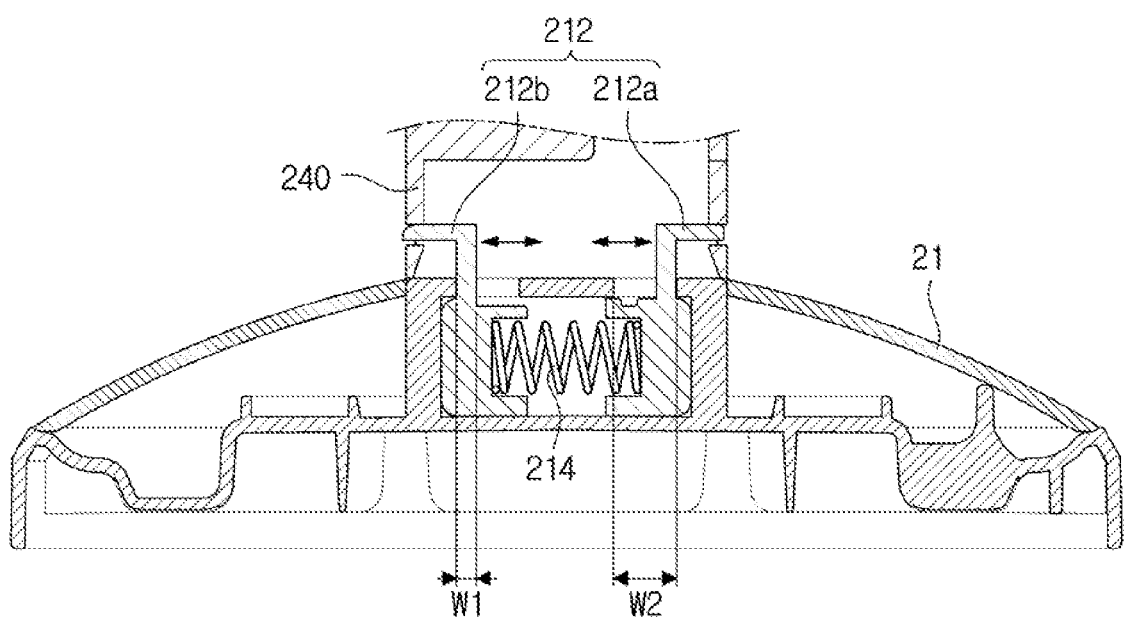
FIG. 13 is a view illustrating a coupled state of a lower cover and a grill of a cyclone dust collector according to one embodiment.

FIG. 11 is a view illustrating a lower cover and a portion of a grill of a cyclone dust collector according to one embodiment, FIG. 12 is a view illustrating a portion of a grill of a cyclone dust collector according to one embodiment, and FIG. 13 is a view illustrating a coupled state of a lower cover and a grill of a cyclone dust collector according to one embodiment.

Referring to FIGS. 11 to 13, the lower cover 21 of the cyclone dust collector 2 according to one embodiment may be locked in a state in which it is closed by the grill assembly 24. The locking hole 242 may be formed at the grill assembly 24, and the lower cover 21 may be provided with the locking part 212 which may be inserted into the locking hole 242. A plurality of locking parts 212 and a plurality of locking holes 242 may be provided.

Each of the locking parts 212 may be provided to protrude from an upper surface of the lower cover 21 in a bent form. The locking part 212 extends upward from the lower cover 21, and an end part thereof may be formed to be bent toward an outer diameter of the lower cover 21.

For example, the locking parts 212 may include a first locking part 212a and a second locking part 212b spaced apart from the first locking part 212a by a predetermined distance. The first locking part 212a and the second locking part 212b protrude upward from the upper surface of the lower cover 21, and an end part of the first locking part 212a is bent to face the second locking part 212b and an end part of the second locking part 212b is bent to face the first locking part 212a.

A hole 213 through which the locking part 212 passes may be formed at the lower cover 21. The locking part 212 is provided to linearly move in the hole 213. When a plurality of locking parts 212 are provided, a plurality of holes 213 may be provided to correspond to the locking parts 212. When the locking part 212 includes the first locking part 212a and the second locking part 212b, the hole 213 may include a first hole 213a through which the first locking part 212a passes and a second hole 213b through which the second locking part 212b passes.

A width W2 of the hole 213 may be formed to be greater than a width W1 of the locking part 212. The locking part 212 may be provided to be movable within the width W2 of the hole 213.

An elastic member 214 which delivers an elastic force to the locking part 212 may be further provided at the lower cover 21. The elastic member 214 provides the elastic force in a direction of pushing the locking part 212 toward an outer side of the hole 213. When an external force is removed after the locking part 212 moved toward an inner side of the hole 213 due to an external force, the locking part 212 may be returned to the outer side of the hole 213 by the elastic force of the elastic member 214. Here, the inner side of the hole 213 refers to a direction in which the approximate center of the lower cover 21 is positioned and the outer side of the hole 213 refers to an outer diameter direction of the lower cover 21.

The locking hole 242 may be positioned at a lower side of the grill 240. In a state in which the grill assembly 24 is installed at the cyclone dust collector 2 and the lower cover 21 is opened, when the lower cover 21 is closed, the locking part 212 may be pressed by the grill 240 and moved toward the inner side of the hole 213. When an end part of the locking part 212 is inserted into the locking hole 242, the locking part 212 may be moved toward the outer side of the locking hole 242 due to the elastic force of the elastic member 214. With the end part of the locking part 212 inserted into the locking hole 242 and fixed, the lower cover 21 may be fixed in a state which is closed at a lower part of the case 20.

The lower cover 21 may be opened by rotating the grill assembly 24 in one direction. When the grill assembly 24 is rotated in the one direction, the locking part 212 is pressed by an inside wall of the grill 240 and may leave the locking hole 242. Once the locking part 212 leaves the locking hole 242, the locked state is released and the lower cover 21 may be rotated about the rotating protrusion 211 and opened.

A guide part 243 may be provided to facilitate operations in which the locking part 212 is inserted into or leaves the locking hole 242. The guide part 243 is provided at a lower side of the locking hole 242, and a thickness W3 of the guide part 243 may be provided to be smaller than a thickness W4 of an inner side surface of the grill 240. The guide part 243 is provided at the inner side surface of the grill 240 to facilitate the operation of the locking part 212.

Figure 14:
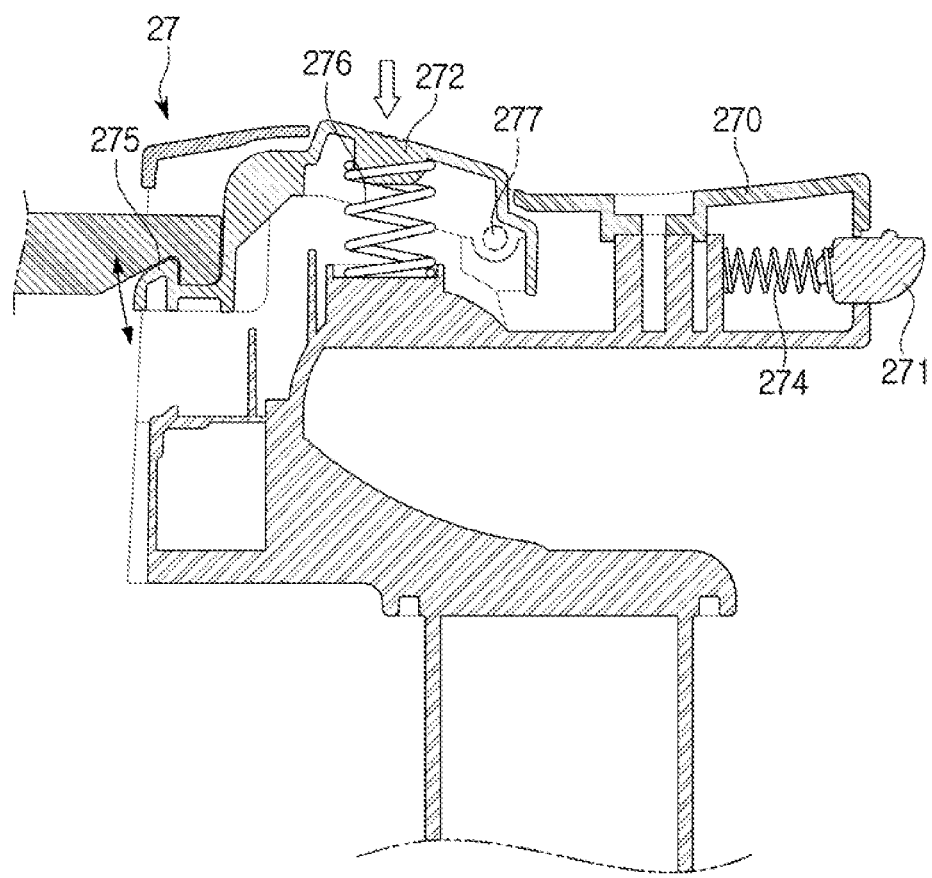
FIG. 14 is a cross-sectional view illustrating a portion of an operation part of a cyclone dust collector according to one embodiment.

FIG. 14 is a cross-sectional view illustrating a portion of an operation part of a cyclone dust collector according to one embodiment.

Referring to FIG. 14, the operation part 27 of the cyclone dust collector 2 according to one embodiment may be provided with a latch 275 for coupling with the main body 11. The latch 275 may be operated by the operation button 272. The operation button 272 and the latch 275 may be connected. When the operation button 272 is pressed downward, the latch 275 may be moved downward along with the operation button 272. The latch 275 coupled to one side of the main body 11 may be released the coupling by the pressing of the operation button 272. As described above, a user may press the operation button 272 to release the coupling of the cyclone dust collector 2 and the main body 11, and thus the cyclone dust collector 2 may be detached from the main body 11.

The operation button 272 may be supported by an elastic member 276. When a force pressing the operation button 272 is removed, the operation button 272 may be returned to its original position due to an elastic force of the elastic member 276. Along with the operation button 272, the latch 275 may also move upward to be returned to its original position.

A user may couple the cyclone dust collector 2 to the main body 11 by matching the latch 275 to correspond to a coupling part of the main body 11 and pressing it. When the latch 275 is pressed, the latch 275 is moved downward and then may be returned upward due to the elastic force of the elastic member 276. Therefore, the latch 275 is coupled to the one side of the main body 11, and the cyclone dust collector 2 may be coupled to the main body 11.

Figure 15:
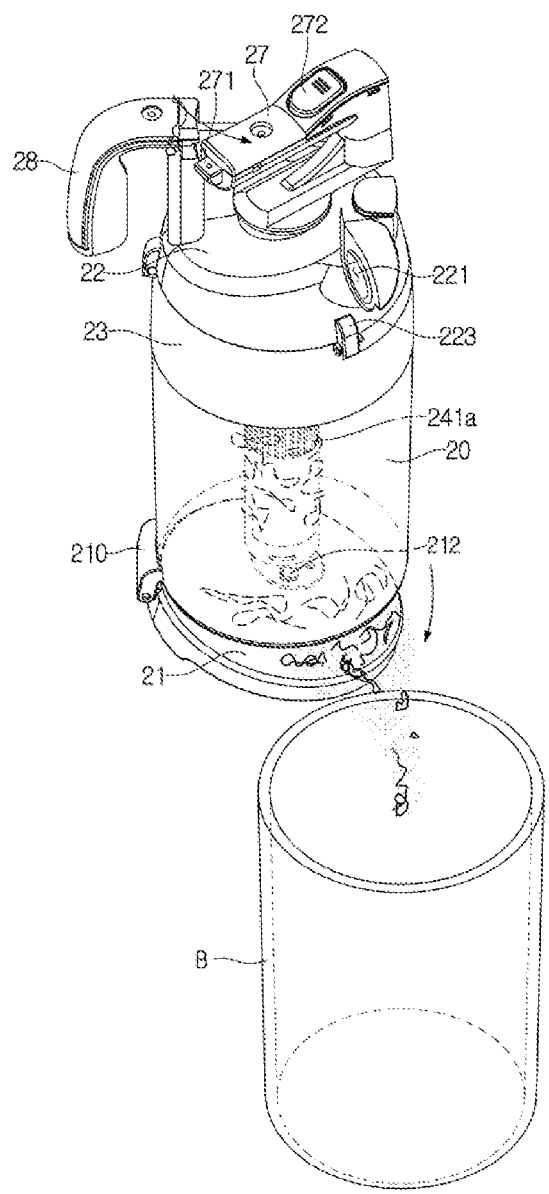
FIGS. 15 to 17 are views illustrating an operation of emptying dust in a cyclone dust collector according to one embodiment.
Figure 16:
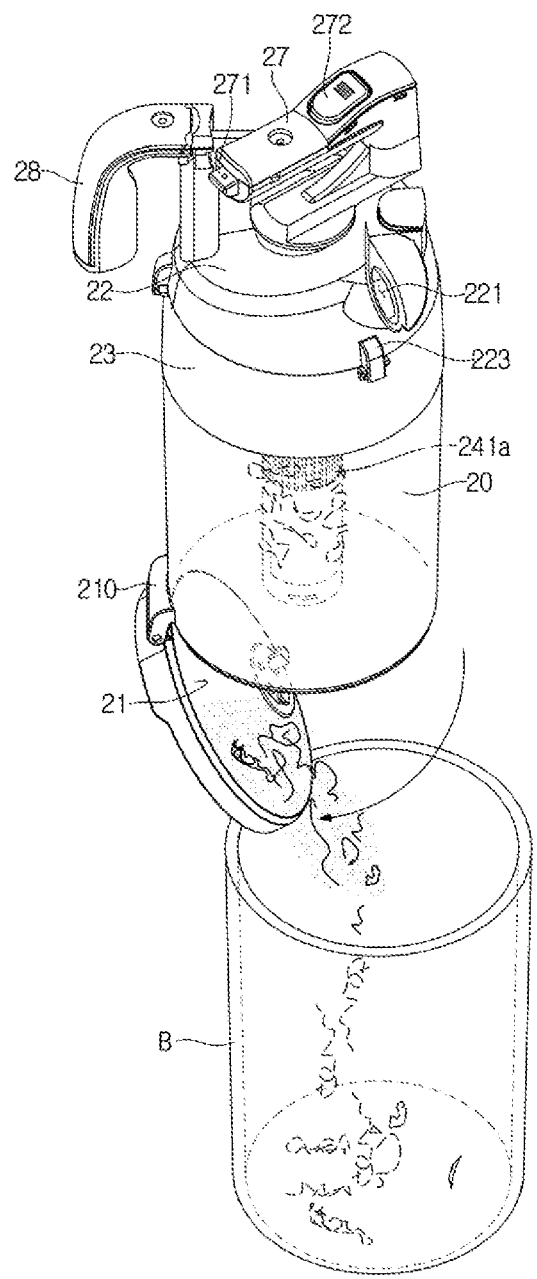
Figure 17:
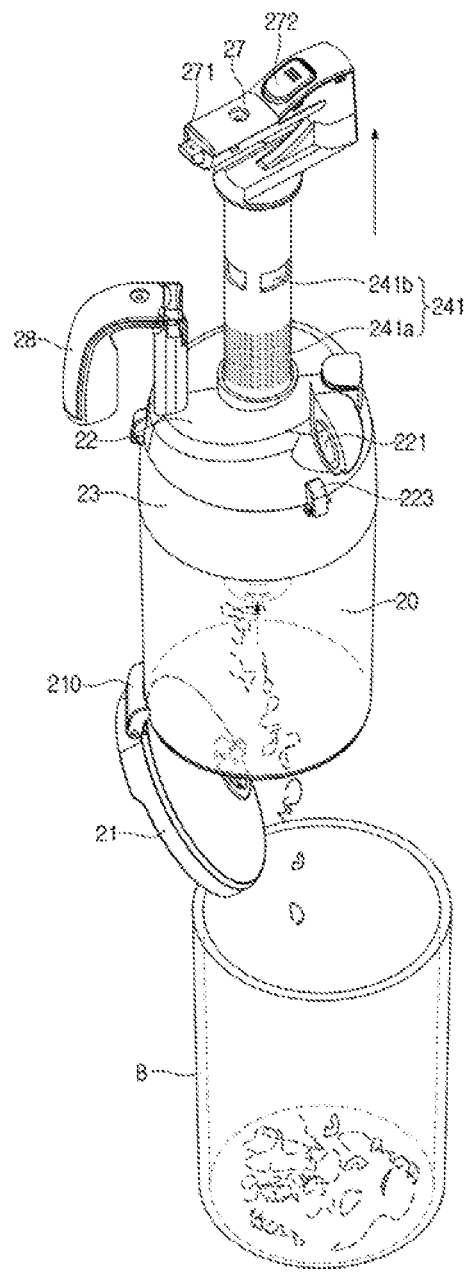

FIGS. 15 to 17 are views illustrating an operation of emptying dust in a cyclone dust collector according to one embodiment.

Referring to FIGS. 15 to 17, for throwing away the dust collected in the cyclone dust collector 2 according to one embodiment, a user may open the lower cover 21 by rotating the grill assembly 24 of the cyclone dust collector 2 in one direction. The user may rotate the grill assembly 24 in the one direction by rotating the operation part 27 connected to the grill assembly 24 in the one direction.

When the grill assembly 24 is rotated in the one direction, the locking part 212 provided at the lower cover 21 may leave the locking hole 242 provided at the grill 240. Once the locking part 212 leaves the locking hole 242, the locked state of the lower cover 21 is released, and the lower cover 21 may be opened. The dust collected in the case 20 may be thrown away when the lower cover 21 is opened.

The grill assembly 24 may be relatively moved with respect to the case 20 and the upper cover 22 by an external force. Specifically, a user may pull the grill assembly 24 out of the case 20. By the operation of pulling out the grill assembly 24, the dust adhered to the surface of the grill 240 may be removed. The dust adhered to the surface of the grill 240 may be interfered with and removed by the inside wall which forms the opening 231 of the intermediate cover 23 and the cleaning part 238 separately provided to protrude at the bottom surface of the intermediate cover 23.

As described above, a user may empty the dust collected in the case 20 without needing to open the upper cover 22 to empty the dust collected in the cyclone dust collector 2 by an operation of rotating the grill assembly 24 in one direction 24 to open the lower cover 21.

Here, the grill assembly 24 may be rotated in one direction in a state in which the upper cover 22 of the cyclone dust collector 2 is positioned at an upper part, the lower cover 21 is positioned at a lower part, and a garbage can B is positioned thereunder. When the grill assembly 24 is rotated in the one direction, the lower cover 21 is opened and the dust collected in the case 20 is thrown into the garbage can B.

Conventionally, the upper cover is opened and the case is turned over so that the bottom surface of the case is positioned at an upper side thereof to empty the dust collected in the case B. In the case of the present disclosure, there is no need to turn the case 20 over to empty the case 20, and the lower part of the case 20 is opened and the dust is emptied only with an operation of rotating the grill assembly 24, thereby the dust in the case 20 may be more conveniently emptied compared to a conventional cyclone dust collector.

In addition, conventionally, the dust adhered to the surface of the grill 240 is removed through a process of picking it off by hand of a user or the like. However, in the case of the present disclosure, the dust adhered to the grill 240 may be removed with only an operation of pulling out the grill assembly 24. As there is no need to pick the dust adhered to the grill 240 off by hand, it is more convenient in use and sanitary compared to a conventional method.

A structure in which the cyclone dust collector 2 is coupled to the main body 11, a structure in which the upper cover 22 is coupled to the intermediate cover 23, a structure in which the operation part 27 is coupled to the handle 28, a shape and structure of the cleaning part 238, etc. are not limited to the above descriptions.

According to one aspect of the present disclosure, because there is no need for a user to pick dust or the like adhered to an outer circumferential surface of the grill off by hand, the cyclone dust collector is easy to use.

In addition, when removing dust or the like adhered to an outer circumferential surface of the grill, generation of secondary contamination around the case can be prevented.

Although a few embodiments of the present disclosure have been shown and described, it should be appreciated by those skilled in the art that changes may be made in these embodiments without departing from the principles and spirit of the invention, the scope of which is defined in the claims and their equivalents.

What is claimed is:

1. A vacuum cleaner to collect dust, the vacuum cleaner comprising:
    a cyclone dust collector including:
        a case including a bottom and an upper part;
        a first cover couplable to the bottom of the case to selectively open and close the bottom of the case and includes a locking part,
        a second cover configured to cover the upper part of the case, and
        a grill assembly configured to be detachable from the cyclone dust collector as the first cover coupled to the bottom of the case is being opened to remove dust from the grill assembly while the grill assembly detaches from the cyclone dust collector, wherein the grill assembly is selectively couplable to and detachable from the second cover and includes a locking hole into which the locking part is inserted,
        wherein the first cover further includes a sliding hole through which the locking part passes to be inserted into the locking hole to lock the first cover to the grill assembly.

2. The vacuum cleaner of claim 1, wherein:
    the second cover includes a cleaning part, and
    the grill assembly removes dust adhered to a surface of the grill assembly using the cleaning part while the grill assembly is detaching from the second cover.

3. The vacuum cleaner of claim 2, wherein the cleaning part is provided to protrude from a bottom surface of the second cover.

4. The vacuum cleaner of claim 1, wherein the second cover includes an opening through which the grill assembly passes.

5. The vacuum cleaner of claim 1, wherein the grill assembly includes a locking part configured to lock the grill assembly to the second cover while the grill assembly is selectively coupled to the second cover, and the second cover includes a locking hole into which the locking part is inserted to lock the grill assembly.

6. The vacuum cleaner of claim 1, wherein the second cover includes a microfilter configured to filter the collected dust from air.

7. The vacuum cleaner of claim 1, wherein:
the grill assembly is configured to be pulled out of the upper part of the case to be detached from the upper part of the case.

8. The vacuum cleaner of claim 7, wherein:
the grill assembly includes a locking hole into which the locking part is inserted to lock the cover.

9. The vacuum cleaner of claim 8, wherein the locking part moves in a radial direction in the sliding hole when the locking part is pressed by the grill assembly to lock the first cover.

10. The vacuum cleaner of claim 8, wherein the first cover further includes an elastic member configured to provide the locking part with an elastic force.

11. The vacuum cleaner of claim 10, wherein:
the locking part is moved in one direction when the locking part is pressed by the grill assembly to lock the first cover, and
the locking part is moved in the other direction by the elastic force of the elastic member to return to an original position thereof when a force applied to the locking part to unlock the first cover.

12. The vacuum cleaner of claim 7, wherein the first cover is opened when the grill assembly is rotated in one direction.

13. The vacuum cleaner of claim 7, wherein, when the first cover is coupled to the case, the first cover is coupled by a hinge to the case.

\* \* \* \* \*